(12) United States Patent
Tsoi et al.

(10) Patent No.: US 12,353,324 B2
(45) Date of Patent: Jul. 8, 2025

(54) SPARSE DATA STORAGE METHOD FOR DEEP LEARNING, COMPUTER DEVICE AND STORAGE MEDIUM

(71) Applicant: Shenzhen Corerain Technologies Co., Ltd., Shenzhen (CN)

(72) Inventors: Kuen Hung Tsoi, Shenzhen (CN); Xinyu Niu, Shenzhen (CN)

(73) Assignee: SHENZHEN CORERAIN TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/362,178

(22) Filed: Jul. 31, 2023

(65) Prior Publication Data
US 2024/0126684 A1 Apr. 18, 2024

(30) Foreign Application Priority Data
Oct. 12, 2022 (CN) .................. 202211244929.X

(51) Int. Cl.
*G06F 12/02* (2006.01)
*G06F 12/0895* (2016.01)
*G06F 13/16* (2006.01)

(52) U.S. Cl.
CPC ...... *G06F 12/0238* (2013.01); *G06F 12/0895* (2013.01); *G06F 13/1678* (2013.01)

(58) Field of Classification Search
CPC ............. G06F 12/0238; G06F 12/0895; G06F 13/1678; G06F 3/0629; G06F 3/061; G06F 12/0877; Y02D 10/00; G06N 3/08
(Continued)

(56) References Cited

U.S. PATENT DOCUMENTS 10,411,727 B1  9/2019  Lan et al.
2015/0242484 A1*  8/2015  Zhao ................ G06F 16/22
                                            707/755
(Continued)

FOREIGN PATENT DOCUMENTS

CN  110456983 A  11/2019
CN  110520909 A  11/2019
(Continued)

OTHER PUBLICATIONS

Office Action issued on Nov. 18, 2022, in corresponding Chinese Application No. 202211244929.X, 10 pages.
(Continued)

*Primary Examiner* — Hosain T Alam
*Assistant Examiner* — Zubair Ahmed
(74) *Attorney, Agent, or Firm* — Maier & Maier, PLLC

(57) ABSTRACT

A sparse data storage method for deep learning, a computer device and a storage medium. The method includes: obtaining an offset between current non-zero data and previous non-zero data of the current non-zero data, and generating to-be-transmitted data according to the current non-zero data and the offset, where the to-be-transmitted data is stored in a first memory; obtaining the to-be-transmitted data, calculating an address increment according to the offset, and obtaining, according to the address increment, a storage address in which the current non-zero data is to be stored in a second memory; and transmitting the current non-zero data to the second memory, and storing the current non-zero data in the storage address in the second memory. According to the embodiments, the power consumption and costs required by deep learning operations can be reduced.

16 Claims, 3 Drawing Sheets

(58) Field of Classification Search
USPC .................................................. 711/154, 100
See application file for complete search history.

(56) References Cited

U.S. PATENT DOCUMENTS

| | | | |
|---|---|---|---|
| 2016/0070649 A1* | 3/2016 | Maeda ................ | G06F 12/0862 |
| | | | 711/135 |
| 2018/0046900 A1* | 2/2018 | Dally .................. | G06F 9/30018 |
| 2019/0379396 A1* | 12/2019 | Bajic ....................... | G06F 17/16 |
| 2022/0012598 A1* | 1/2022 | Fok ........................ | G06F 9/3836 |

FOREIGN PATENT DOCUMENTS

| | | |
|---|---|---|
| CN | 112286864 A | 1/2021 |
| CN | 114970810 A | 8/2022 |
| JP | H0764968 A | 3/1995 |

OTHER PUBLICATIONS

Office Action issued on Dec. 7, 2022, in corresponding Chinese Application No. 202211244929X, 7 pages.
Search Report issued Nov. 14, 2022, in corresponding Chinese Application No. 202211244929X, 2 pages with partial English translation.
Supplementary Search Report issued on Dec. 16, 2022, in corresponding Chinese Application No. 202211244929.X, 4 pages.
Office Action issued on Dec. 20, 2022, in corresponding Chinese Application No. 202211244929.X, 3 pages.

* cited by examiner

SPARSE DATA STORAGE METHOD FOR DEEP LEARNING, COMPUTER DEVICE AND STORAGE MEDIUM

TECHNICAL FIELD

The present disclosure relates to the technical field of deep learning, and in particular to a sparse data storage method for deep learning, a computer device and a storage medium.

BACKGROUND

With the rapid development of deep learning, convolutional neural networks have been widely used in machine vision applications, such as image recognition and image classification. Due to the characteristics of deep learning, a large number of zeros appear at random locations in the data as the computation proceeds. Data including a large number of zeros on a double data rate synchronous dynamic random access memory (DDR SDRAM) needs to be transmitted to a static random access memory (SRAM) for convolution, and the large number of zeros result in a large amount of data to be transmitted, posing a high requirement on the transmission bandwidth for transmitting the data.

To meet the requirement on the transmission bandwidth, high bandwidth memory (HBM) transmission is used, i.e., a large number of DDRs are stacked together. In other words, the transmission rate is increased by increasing the number of DDRs used. However, HBM transmission leads to increased costs and power consumption.

SUMMARY

Therefore, to solve the above problems, it is necessary to provide a sparse data storage method for deep learning, a computer device, and a storage medium, to effectively reduce the amount of data to be transmitted during deep learning operations and lower the requirement of deep learning operations on the data transmission bandwidth, thereby reducing the power consumption and costs required by deep learning operations.

A sparse data storage method for deep learning is provided, which includes:

obtaining an offset between current non-zero data and previous non-zero data of the current non-zero data, and generating to-be-transmitted data according to the current non-zero data and the offset, where the to-be-transmitted data is stored in a first memory;

obtaining the to-be-transmitted data, calculating an address increment according to the offset, and obtaining, according to the address increment, a storage address in which the current non-zero data is to be stored in a second memory; and transmitting the current non-zero data to the second memory, and storing the current non-zero data in the storage address in the second memory.

After the step of storing the current non-zero data in the storage address in the second memory, the sparse data storage method further includes:

generating a valid tag for tagging the storage address; and reading whether the data stored in the storage address is non-zero data according to the valid tag, and selecting the current non-zero data or zero for computation.

The step of generating a valid tag for tagging the storage address includes:

generating a tag character string, where characters in the tag character string that correspond to the storage address are denoted by 1, with other characters being denoted by 0.

The step of generating a valid tag for tagging the storage address includes:

storing the valid tag in the second memory, or storing the valid tag in a third memory.

The first memory is a double data rate synchronous dynamic random access memory, the second memory is a static random access memory, and the third memory is a buffer.

A preset location of the to-be-transmitted data is the current non-zero data, and a remaining location of the to-be-transmitted data is the offset.

Before the step of generating to-be-transmitted data according to the current non-zero data and the offset, the sparse data storage method further includes:

determining a bit number of the remaining location according to a maximum amount of data supported by a round of operation; and determining a bit number of the preset location according to a data type used in deep learning.

The current non-zero data includes at least one of computational data for computation in deep learning and a neural network parameter.

A computer-readable storage medium is provided, which has a computer program stored thereon, and the computer program, when executed by a processor, causes the processor to implement the steps of the foregoing method.

A computer device is provided, which includes a memory and a processor, the memory stores a computer program, and the computer program, when executed by the processor, causes the processor to implement the steps of the foregoing method.

The embodiments of the present disclosure have the following beneficial effects:

when data in the first memory is transmitted to the second memory, the offset between the current non-zero data and the previous non-zero data is obtained, only the non-zero data in the first memory is transmitted, and the non-zero data is stored in the storage address calculated based on the offset in the second memory. Zeros irrelevant to deep learning operations are not transmitted, to effectively reduce the amount of data to be transmitted and lower the requirement of deep learning operations on the data transmission bandwidth, thereby improving the data transmission efficiency and reducing the costs and power consumption for data transmission.

Furthermore, the valid tag for tagging the storage address is generated, so that when the current non-zero data in the storage address is used for convolution subsequently, the current non-zero data can be flexibly read, and the convenience in operation processing is improved.

BRIEF DESCRIPTION OF THE DRAWINGS

To describe the technical solutions in the embodiments of the present disclosure or in the prior art more clearly, the accompanying drawings required for describing the embodiments or the prior art are briefly described below. Apparently, the accompanying drawings in the following description show only some embodiments of the present disclosure, and a person of ordinary skill in the art may still derive other drawings from these accompanying drawings without creative efforts.

In the figures.

DETAILED DESCRIPTION

The following clearly and completely describes the technical solutions in the embodiments of the present disclosure with reference to the accompanying drawings in the embodiments of the present disclosure. Apparently, the described embodiments are only some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
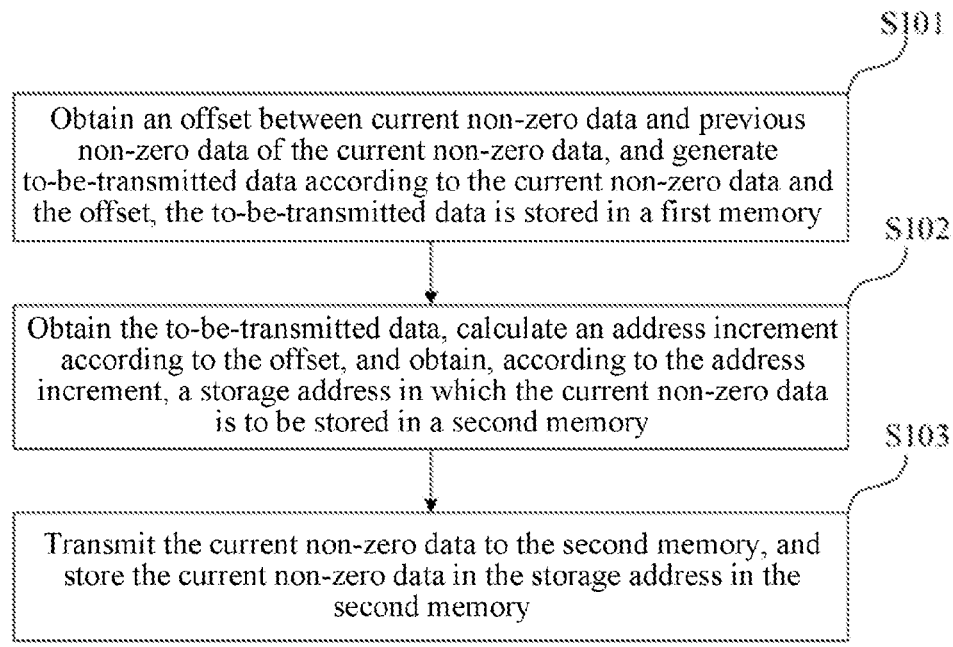
FIG. 1 is a schematic flowchart of a first embodiment of a sparse data storage method for deep learning provided by the present disclosure.
Figure 2:
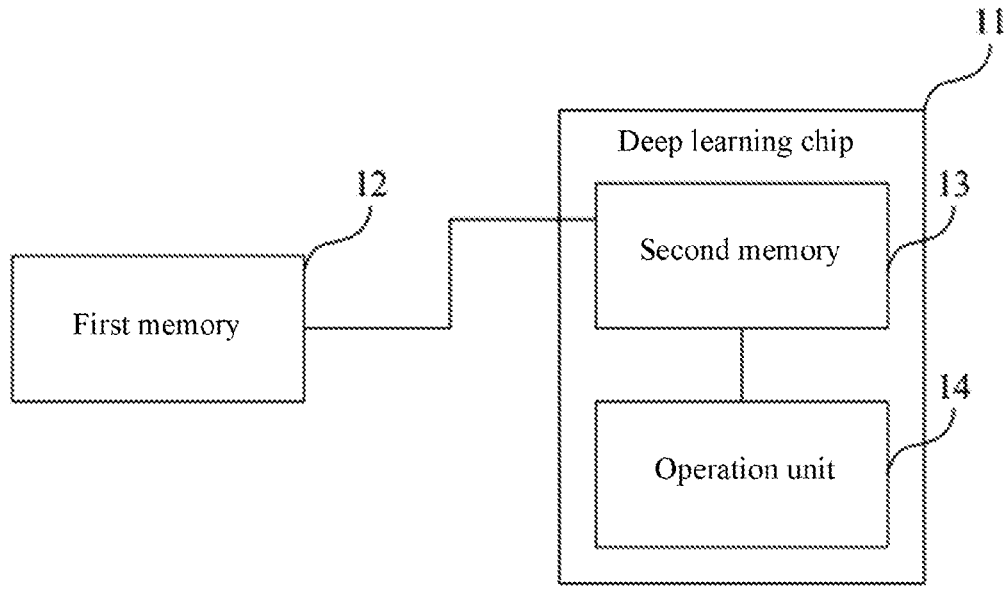
FIG. 2 is a schematic structural diagram of an embodiment of a deep learning system provided by the present disclosure.

Referring to FIG. 1 and FIG. 2, FIG. 1 is a schematic flowchart of a first embodiment of a sparse data storage method for deep learning provided by the present disclosure. FIG. 2 is a schematic structural diagram of an embodiment of a deep learning system provided by the present disclosure. The sparse data storage method for deep learning provided by the present disclosure is applied to a deep learning system. The deep learning system 10 includes a deep learning chip 11 and a first memory 12 located outside the deep learning chip 11; a second memory 13 is arranged in the deep learning chip 11; and data transmission can be performed between the first memory 12 and the second memory 13. An operation unit 14 can also be arranged in the deep learning chip 11, and the operation unit 14 is configured to read data in the second memory 13 for deep learning related operations.

The sparse data storage method for deep learning provided by the present disclosure includes the following steps:

S101: Obtain an offset between current non-zero data and previous non-zero data of the current non-zero data, and generate to-be-transmitted data according to the current non-zero data and the offset, the to-be-transmitted data is stored in a first memory.

In one specific implementation scenario, the data required for deep learning generally includes computational data for computation, such as picture data, and/or a neural network parameter. In this implementation scenario, the computational data is taken as an example for illustration, the principle for the neural network parameter is roughly the same, and the descriptions thereof are omitted herein. The data required for deep learning is generally stored in the first memory serving as an external storage device, and the first memory may be a double data rate synchronous dynamic random access memory (DDR SDRAM). Due to the characteristics of deep learning, data sparsity is an inevitable problem, a large number of zeros appear at random locations in the data required for deep learning as the computation proceeds. Therefore, several irrelevant zeros may exist between data. These zeros do not need to participate in the operation and therefore do not have to be transmitted, and only the non-zero data in the data needs to be transmitted, so as to reduce the amount of operation to be transmitted, thereby lowering the requirement on transmission bandwidth.

The offset between the current non-zero data and the previous non-zero data of the current non-zero data is obtained, and the offset may be the bit number of zeros between the non-zero data and the previous non-zero data. The current non-zero data and the previous non-zero data are both non-zero data, and if N data values from the previous data to the current non-zero data are zeros, the offset is N.

The to-be-transmitted data is generated according to the current non-zero data and the offset, that is, the current non-zero data can be combined with the offset to generate the to-be-transmitted data. In one implementation scenario, a structure format of the to-be-transmitted data can be preset, some locations of the to-be-transmitted data are used as a preset location to fill in the current non-zero data, and some remaining locations are used as a remaining location to fill in the offset. The preset location of the current non-zero data and the remaining location of the offset may be adjacent to each other or spaced apart from each other, which is not limited herein. The preset location of the current non-zero data and/or the remaining location of the offset may be continuous or spaced apart from each other, which can be set by a user according to actual requirements.

In one implementation scenario, the bit number of the remaining location in the structure format of the to-be-transmitted data and the bit number of the preset location are preset. For example, the bit number of the remaining location is determined according to the maximum amount of data supported by a round of operation. If a deep learning operation supports a maximum of 4096 data operations, the offset is up to log 2(4096)=12 bits. Therefore, in order to ensure that the remaining location meets the maximum offset, the bit number of the remaining location is set to at least 12, and may be set to 12, 16, and the like. The bit number of the preset location is determined according to a data type used in deep learning. The data commonly used in the deep learning operations may be 8/16/32 bits. The bit number of the preset location is determined according to the actually used data type, for example, the bit number of the preset location may be set to 16 bits in this implementation scenario.

S102: Obtain the to-be-transmitted data, calculate an address increment according to the offset, and obtain, according to the address increment, a storage address in which the current non-zero data is to be stored in a second memory.

In one specific implementation scenario, after the to-be-transmitted data stored in the first memory is obtained, the offset of the to-be-transmitted data is read, for example, the to-be-transmitted data is 0x10010008, high-bit data of the 16 bits is used for representing the current non-zero data, and low-bit data of the 16 bits is used for representing the offset. Therefore, the offset is 8, which means that there are seven zeros between the current non-zero data and the previous non-zero data. The address increment is calculated according to the offset, specifically, the address increment is calculated in combination with a data format used in the deep learning operations. For example, if data of int 8 is used, an address increases by 1 Byte for every increment of 1 of the offset. If data of int 16 is used, the address increases by 2 Byte for every increment of 1 of the offset.

The storage address in which the current non-zero data is to be stored in the second memory is obtained according to the address increment, for example, when the data of int 8 is used in deep learning, the address increases by 1 Byte for every increment of 1 of the offset. The storage address in which the current non-zero data is to be stored in the second memory is obtained based on the width of 16 bits of the second memory.

S103: Transmit the current non-zero data to the second memory, and store the current non-zero data in the storage address in the second memory.

In one specific implementation scenario, the current non-zero data is transmitted to the second memory and stored in the storage address obtained in the above step. For example, if the first to-be-transmitted data is 0x12340000, the current non-zero data is 0x1234, and the data 0x1234 is written in the address 0 of the second memory. If the second to-be-transmitted data is 0x10010008, the current non-zero data is 0x1001, the offset is 8, and the data 0x1001 is written in the address 8 of the second memory.

According to the foregoing description, in this embodiment, when data in the first memory is transmitted to the second memory, the offset between the current non-zero data and the previous non-zero data is obtained, only the non-zero data in the first memory is transmitted, and the non-zero data is stored in the storage address calculated based on the offset in the second memory. Zeros irrelevant to deep learning operations are not transmitted, to effectively reduce the amount of data to be transmitted and lower the requirement of deep learning operations on the data transmission bandwidth, thereby improving the data transmission efficiency and reducing the costs and power consumption for data transmission.

Figure 3:
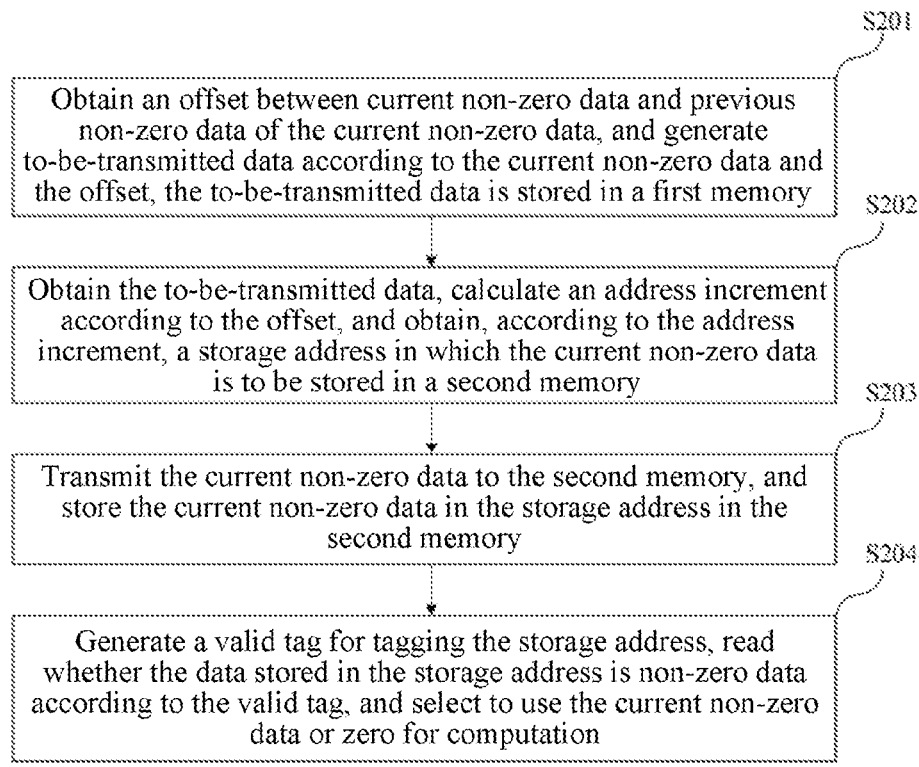
FIG. 3 is a schematic flowchart of a second embodiment of the sparse data storage method for deep learning provided by the present disclosure.

Referring to FIG. 3 and FIG. 2 together, FIG. 3 is a schematic flowchart of a second embodiment of the sparse data storage method for deep learning provided by the present disclosure. The data transmission and storage method provided by the present disclosure includes the following steps:

S201: Obtain an offset between current non-zero data and previous non-zero data of the current non-zero data, and generate to-be-transmitted data according to the current non-zero data and the offset, the to-be-transmitted data is stored in a first memory.

S202: Obtain the to-be-transmitted data, calculate an address increment according to the offset, and obtain, according to the address increment, a storage address in which the current non-zero data is to be stored in a second memory.

S203: Transmit the current non-zero data to the second memory, and store the current non-zero data in the storage address in the second memory.

In one specific implementation scenario, steps S201-S203 are substantially the same with steps S101-S103 in the first embodiment of the sparse data storage method for deep learning provided by the present disclosure, and the descriptions thereof are omitted herein.

S204: Generate a valid tag for tagging the storage address, read whether the data stored in the storage address is non-zero data according to the valid tag, and select to use the current non-zero data or zero for computation.

In one specific implementation scenario, the valid tag for tagging the storage address is generated by adding a tag to the storage address or recording the location of the storage address. The current non-zero data stored in the storage address is read according to the valid tag for computation. The data in other addresses than the storage address in the second memory should be 0, but the data in the other addresses is not processed in this step. This is because in the deep learning, the result of convolutions performed on 0 is still 0, and whether 0 into the computation has no effect on the convolution operation result. Therefore, in this implementation scenario, the data in other addresses is not processed, to reduce the time required for data storage. Because only the current non-zero data stored in the storage address is retrieved for computation, the computational amount required by the operation is effectively reduced without affecting the correctness of the computation result.

In this implementation scenario, whether the data stored in each address in the second memory is non-zero data can be determined according to the valid tag, so that the current non-zero data or zero is selected for computation according to actual requirements. For example, all the non-zero data within the scope covered by a convolution and the storage addresses of the non-zero data can be read according to the valid tag to carry out convolution, or the data that corresponds to which addresses within the scope covered by the computation is actually 0 can be obtained according to the valid tag, and these zeros can be selected for computation.

The valid tag can be stored in the second memory or in a third memory. In one implementation scenario, the first memory is a double data rate synchronous dynamic random access memory, the second memory is a static random access memory, and the third memory is a buffer.

In one implementation scenario, a tag character string is generated, and the storage address in the second memory is obtained by reading the tag character string. Characters in the tag character string that correspond to the storage address are denoted by 1, with other characters being denoted by 0, and the current non-zero data stored in the storage addresses that correspond to the characters denoted by 1 is read for computation.

In one implementation scenario, in the to-be-transmitted data, high-bit data of the 16 bits is used for representing the current non-zero data, and low-bit data of the 16 bits is used for representing the offset. A deep learning operation input picture is 4×4, and the kernel of the convolution operation is 3×3. Data storage is arranged in a row-column order. The to-be-transmitted data stored in the first memory is: 0x12340000; 0x10010008; 0xabcd0002; 0x5a5a0004. According to the to-be-transmitted data, 0x1234 is written in the address 0, 0x1001 is written in the address 8, 0xabcd is written in the address a, and 0x5a5a is written in the address e in the second memory in sequence. Data in other addresses may remain unchanged and does not need to be processed, or may be regarded as 0 by default. Meanwhile, before transmission, the data valid tag is cleared. During transmission, bit 0, bit 8, bit 10, and bit 14 are set to 1 to generate the tag character string. In this case, the data valid tag is 0b0100_0101_0000_0001, and the data stored in the SRAM is shown in Table 1:

TABLE 1

| 0x1234  | 0xXXXX | 0xXXXX | 0xXXXX |
|---------|--------|--------|--------|
| 0xXXXX  | 0xXXXX | 0xXXXX | 0xXXXX |
| 0x1001  | 0xXXXX | 0xabcd | 0xXXXX |
| 0xXXXX  | 0xXXXX | 0x5a5a | 0xXXXX |

After the operation begins, the operation in the first location of a convolution kernel needs to read the data with coordinates (0, 0), (0, 1), (0, 2), (1, 0), (1, 1), (1, 2), (2, 0), (2, 1), and (2, 2) in sequence. The valid tags that correspond to the data with coordinates (0, 0), (2, 0), and (2, 2) are respectively bit 0, bit 8, and bit 10, and the corresponding value is 1. The current non-zero data 0x1234, 0x1001, and 0xabcd of the storage addresses (0, 0), (2, 0), and (2, 2) is read, the valid tag that corresponds to the data in other addresses is 0, and the operation is skipped. For another example, the operation in the second location of the convolution kernel in the subsequent operation needs to read the data with coordinates (0, 1), (0, 2), (0, 3), (1, 1), (1, 2), (1, 3), (2, 1), (2, 2), and (2, 3) in sequence. The valid tag that corresponds to the data with coordinates (2, 2) is bit 10, and the corresponding value is 1. The current non-zero data stored in the storage address (2, 2) is read, the valid tag that corresponds to the data in other addresses is 0, and the operation is skipped.

The subsequent operation is similar, and the descriptions thereof are omitted herein.

It can be seen from the description above that in this embodiment, the current non-zero data is transmitted to the second memory and stored in the storage address in the second memory, and the valid tag for tagging the storage address is generated. The current non-zero data stored in the storage address is read according to the valid tag for computation, to effectively reduce the amount of data need to be stored in the second memory. 0 does not need to be reset for other addresses in the second memory, to effectively reduce the time for storing data in the second memory, and improve the data storage efficiency. Meanwhile, the current non-zero data stored in the second memory can be flexibly obtained based on the valid tag for computation, to preferably support the operation mode such as the convolution operation which does not carry out data operation in sequence.

In one implementation scenario, the method shown in FIG. 1 and/or FIG. 2 is applied to the deep learning system. The deep learning system includes the deep learning chip and the first memory (for example, DDR), and the second memory (for example, SRAM) is arranged on the deep learning chip. The first memory is connected with the second memory by a data storage circuit. The deep learning chip is further provided with a data reading circuit and the operation unit. The data reading circuit is connected to the second memory and a third memory (when the valid tag is stored in the third memory (register)), and the current non-zero data in the storage address is obtained by the data reading circuit and transmitted to the operation unit in the deep learning chip for the convolution operation.

Figure 4:
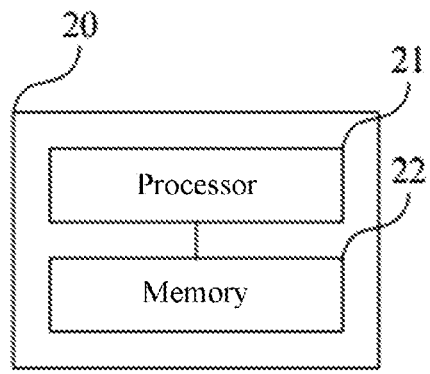
FIG. 4 is a schematic structural diagram of an embodiment of a computer device provided by the present disclosure.

Referring to FIG. 4, FIG. 4 is a schematic structural diagram of an embodiment of a computer device provided by the present disclosure. An intelligent device 10 includes a processor 21 and a memory 22. The processor 21 is coupled to the memory 22. The memory 22 stores a computer program, and the computer program is executed by the processor 21 during operation to implement the foregoing method. Referring to the above descriptions for detailed steps, which are omitted herein.

Figure 5:
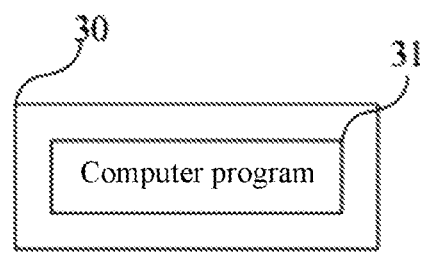
FIG. 5 is a schematic structural diagram of an embodiment of a computer-readable storage medium provided by the present disclosure.

Referring to FIG. 5, FIG. 5 is a schematic structural diagram of an embodiment of a computer-readable storage medium provided by the present disclosure. The computer-readable storage medium 30 stores at least one computer program 31, and the computer program 31 is executed by a processor to implement the foregoing method. Referring to the above descriptions for detailed steps, which are omitted herein. In one embodiment, the computer-readable storage medium 30 may be a storage chip, a hard disk or other read-write storage tools such as a removable hard disk, a USB flash drive and a compact disc in a terminal, or may be a server.

The storage medium may be implemented by any type of volatile or non-volatile storage devices or a combination thereof. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc, or a compact disc read-only memory (CD-ROM); and the magnetic surface memory may be a disk memory or a tape memory. The volatile memory may be a random access memory (RAM) and is used as an external cache. By way of example and not limiting various RAMs are available, such as a static random access memory (SRAM), a synchronous static random access memory (SSRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DRRAM). The storage medium described in the embodiments of the present disclosure is intended to include, but not limited to, these memories and any other suitable memories.

In the several embodiments provided by the present disclosure, it should be understood that the disclosed system and method may be implemented in other manners. The described device embodiments are merely exemplary. For example, the unit division is merely logical function division and may adopt other division manners during actual implementation. For example, a plurality of units or components may be combined or integrated into another system, or some features may be ignored or not performed. In addition, the displayed or discussed mutual couplings or direct couplings or communication connections between the components may be implemented through some interfaces, and indirect couplings or communication connections between the devices or units may be electrical connections, mechanical connections, or connections in other forms.

The units described as separate parts may or may not be physically separate, and components displayed as units may or may not be physical units, that is, may be located in one location, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in a form of a hardware and software functional unit.

A person of ordinary skill in the art may understand that: all or some of the steps of the foregoing method embodiments may be implemented by a program instructing relevant hardware. The program may be stored in a computer-readable storage medium. When the program is executed, the steps of the foregoing method embodiments may be implemented. The foregoing storage medium includes: any medium that can store program codes, such as a removable storage device, a read-only memory (ROM), a random access memory (RAM), a magnetic disk, or a compact disc.

Alternatively, when the integrated unit described in the present disclosure is implemented in the form of a software functional unit and sold or used as an independent product, the integrated unit may be stored in a computer-readable storage medium. Based on such an understanding, the technical solutions of the embodiments of the present disclosure essentially, or the part contributing to the prior art may be implemented in the form of a software product. The computer software product is stored in a storage medium, and includes several instructions for instructing a computer device (which may be a personal computer, a server, or a network device) to perform all or some of the methods described in the embodiments of the present disclosure. The foregoing storage medium includes: any medium that can store program codes, such as a removable storage device, a ROM, a RAM, a magnetic disk, or a compact disc.

The methods disclosed in the method embodiments provided by the present disclosure can be freely combined without conflict to obtain new method embodiments.

The features disclosed in the product embodiments provided by the present disclosure can be freely combined without conflict to obtain new product embodiments.

The features disclosed in the method or device embodiments provided by the present disclosure can be freely combined without conflict to obtain new method or device embodiments.

The foregoing contents are detailed descriptions of the present disclosure with reference to specific optional embodiments, and it should not be considered that the specific implementation of the present disclosure is limited to these descriptions. A person of ordinary skill in the art can further make various equivalent replacements or obvious modifications without departing from the concept of the present disclosure, the performance or use is the same, and such equivalent replacements or obvious modifications should all be considered as falling within the protection scope of the present disclosure.

What is claimed is:

1. A sparse data storage method for deep learning, comprising:
   obtaining an offset between current non-zero data and previous non-zero data of the current non-zero data, and generating to-be-transmitted data according to the current non-zero data and the offset, wherein the to-be-transmitted data is stored in a first memory, wherein the current non-zero data comprises computational data for computation in deep learning;
   obtaining the to-be-transmitted data, calculating an address increment according to the offset, and obtaining, according to the address increment and the storage address of the previous non-zero data, a storage address in which the current non-zero data is to be stored in a second memory;
   transmitting the current non-zero data to the second memory, and storing the current non-zero data in the storage address in the second memory;
   generating a valid tag for tagging the storage address in the second memory, wherein the valid tag is generated by adding a tag to the storage address or recording the location of the storage address; and
   reading the storage addresses of the non-zero data according to the valid tag and all the non-zero data within the scope covered by a convolution, selecting the current non-zero data for convolution computation, and obtaining zero within the scope covered by the convolution for convolution computation according to the valid tag.

2. The sparse data storage method for deep learning according to claim 1, wherein the step of generating a valid tag for tagging the storage address comprises:
   generating a tag character string, wherein characters in the tag character string that correspond to the storage address are denoted by 1, with other characters being denoted by 0.

3. The sparse data storage method for deep learning according to claim 1, wherein the step of generating a valid tag for tagging the storage address comprises:
   storing the valid tag in the second memory, or
   storing the valid tag in a third memory.

4. The sparse data storage method for deep learning according to claim 3, wherein the first memory is a double data rate synchronous dynamic random access memory, the second memory is a static random access memory, and the third memory is a buffer.

5. The sparse data storage method for deep learning according to claim 1, wherein a preset location of the to-be-transmitted data is the current non-zero data, and a remaining location of the to-be-transmitted data is the offset.

6. The sparse data storage method for deep learning according to claim 5, wherein before the step of generating to-be-transmitted data according to the current non-zero data and the offset, the sparse data storage method further comprises:
   determining a bit number of the remaining location according to a maximum amount of data supported by a round of operation; and
   determining a bit number of the preset location according to a data type used in deep learning.

7. A non-transitory computer-readable storage medium, having a computer program stored thereon, wherein the computer program, when executed by a processor, causes the processor to implement a sparse data storage method for deep learning, the method comprising:
   obtaining an offset between current non-zero data and previous non-zero data of the current non-zero data, and generating to-be-transmitted data according to the current non-zero data and the offset, wherein the to-be-transmitted data is stored in a first memory, wherein the current non-zero data comprises computational data for computation in deep learning;
   obtaining the to-be-transmitted data, calculating an address increment according to the offset, and obtaining, according to the address increment and the storage address of the previous non-zero data, a storage address in which the current non-zero data is to be stored in a second memory;
   transmitting the current non-zero data to the second memory, and storing the current non-zero data in the storage address in the second memory;
   generating a valid tag for tagging the storage address in the second memory, wherein the valid tag is generated by adding a tag to the storage address or recording the location of the storage address; and
   reading the storage addresses of the non-zero data according to the valid tag and all the non-zero data within the scope covered by a convolution, selecting the current non-zero data for convolution computation, and obtaining zero within the scope covered by the convolution for convolution computation according to the valid tag.

8. The non-transitory computer-readable storage medium according to claim 7, wherein the step of generating a valid tag for tagging the storage address comprises:
   generating a tag character string, wherein characters in the tag character string that correspond to the storage address are denoted by 1, with other characters being denoted by 0.

9. The non-transitory computer-readable storage medium according to claim 7, wherein the step of generating a valid tag for tagging the storage address comprises:
storing the valid tag in the second memory, or
storing the valid tag in a third memory.

10. The non-transitory computer-readable storage medium according to claim 7, wherein a preset location of the to-be-transmitted data is the current non-zero data, and a remaining location of the to-be-transmitted data is the offset.

11. The non-transitory computer-readable storage medium according to claim 10, wherein before the step of generating to-be-transmitted data according to the current non-zero data and the offset, the sparse data storage method further comprises:
determining a bit number of the remaining location according to a maximum amount of data supported by a round of operation; and
determining a bit number of the preset location according to a data type used in deep learning.

12. A computer device, comprising a memory and a processor, wherein the memory stores a computer program, and the computer program, when executed by the processor, causes the processor to implement a sparse data storage method for deep learning, the method comprising:
obtaining an offset between current non-zero data and previous non-zero data of the current non-zero data, and generating to-be-transmitted data according to the current non-zero data and the offset, wherein the to-be-transmitted data is stored in a first memory, wherein the current non-zero data comprises computational data for computation in deep learning;
obtaining the to-be-transmitted data, calculating an address increment according to the offset, and obtaining, according to the address increment and the storage address of the previous non-zero data, a storage address in which the current non-zero data is to be stored in a second memory;
transmitting the current non-zero data to the second memory, and storing the current non-zero data in the storage address in the second memory;
generating a valid tag for tagging the storage address in the second memory, wherein the valid tag is generated by adding a tag to the storage address or recording the location of the storage address; and
reading the storage addresses of the non-zero data according to the valid tag and all the non-zero data within the scope covered by a convolution, selecting the current non-zero data for convolution computation, and obtaining zero within the scope covered by the convolution for convolution computation according to the valid tag.

13. The computer device according to claim 12, wherein the step of generating a valid tag for tagging the storage address comprises:
generating a tag character string, wherein characters in the tag character string that correspond to the storage address are denoted by 1, with other characters being denoted by 0.

14. The computer device according to claim 12, wherein the step of generating a valid tag for tagging the storage address comprises:
storing the valid tag in the second memory, or
storing the valid tag in a third memory.

15. The computer device according to claim 12, wherein a preset location of the to-be-transmitted data is the current non-zero data, and a remaining location of the to-be-transmitted data is the offset.

16. The computer device according to claim 15, wherein before the step of generating to-be-transmitted data according to the current non-zero data and the offset, the sparse data storage method further comprises:
determining a bit number of the remaining location according to a maximum amount of data supported by a round of operation; and
determining a bit number of the preset location according to a data type used in deep learning.

* * * * *